G. E. MORRIS & C. W. GREGORY.

Rail-Joints.

No. 8,059. Reissued Jan. 29, 1878.

WITNESSES:

Parker H. Sweet Jr.

Wm Smith

INVENTOR:

Geo. E. Morris

C. W. Gregory

J. Wm. Dana Jr. ATTORNEY.

N. PETERS, PHOTO-LITHOGRAPHER, WASHINGTON, D. C.

UNITED STATES PATENT OFFICE.

GEORGE E. MORRIS AND CHARLES W. GREGORY, OF DANVILLE, ILLINOIS.

IMPROVEMENT IN RAIL-JOINTS.

Specification forming part of Letters Patent No. 115,630, dated June 6, 1871; Reissue No. 8,059, dated January 29, 1878; application filed January 28, 1875.

*To all whom it may concern:*

Be it known that we, GEORGE E. MORRIS and CHARLES W. GREGORY, of Danville, in the county of Vermilion and State of Illinois, have invented new and useful improvements in devices for securing and holding in position connecting rails for railways; and we do hereby declare that the following specification, taken in connection with the drawings furnished and forming a part hereof, is a full, clear, and exact description thereof, which will be sufficient to enable others skilled in the art to make and use the same.

Our invention consists in the combination of a metallic plate, two clips, and a wedge or key, as a means for firmly securing the ends of railway-rails together.

The object of our said improvement is to produce a more convenient, compact, durable, and cheaper device for the purpose than before known, being so constructed that large quantities of the devices may be carried with ease upon the ordinary hand-car usually employed by the workmen in charge of the repairs upon the various sections of the railroads, and which may be readily applied and secured in position without other means in the hands of the workmen than the ordinary hammer, thereby avoiding the employment of costly and cumbrous materials, and such as atmospheric changes have the tendency to rapidly destroy or displace, to the detriment or injury of the road and danger to the passing train.

Figure 1:
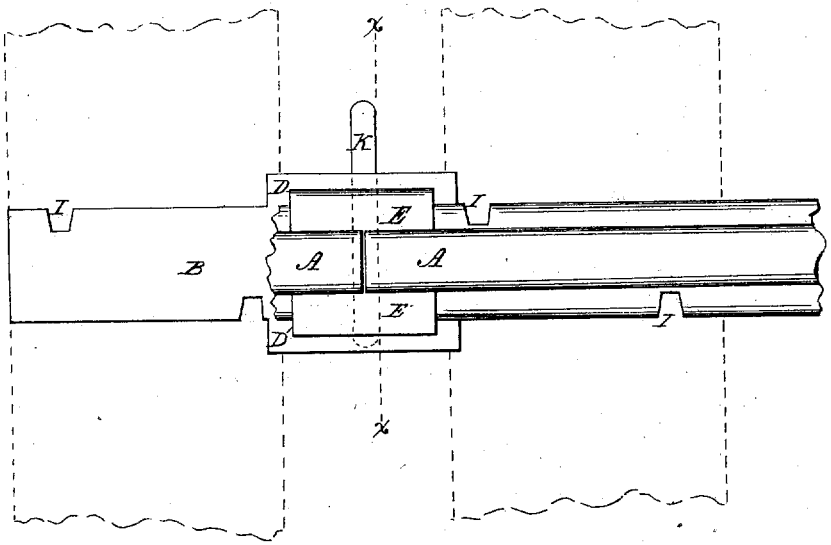
Figure 2:
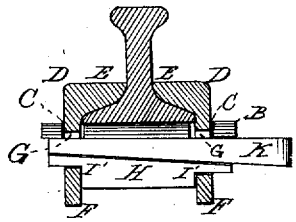

Referring to the drawings, Figure 1 represents a plan view of our improved device for rail-joints. Fig. 2 is a transverse section on line *x x* of Fig. 1.

Similar letters of reference indicate corresponding parts.

A represents the rails, and B the plate upon which the said rails are to rest. Said plate extends some distance on each side of the line of junction of said rails, and preferably from tie to tie. It is provided with two vertical slots, (represented at C,) one near each edge, a space being left between about the width of the base of the rail.

D represents metallic clips, with upper ends E hooking over and embracing the base of the rails, while the shanks or parts represented at F extend down through the slots C. The shanks referred to are provided with holes extending below the under plate B while in position, in which a key or wedge is driven to secure the parts together, whereby a firm splice or strong joint is obtained. A gib (represented at H) is shown in position to aid in holding the clips in position.

When desired, a split key may be employed, with its ends so shaped that working out of position will be prevented. The plate B may be provided with notches on its edges, to coincide with such upon the base of the rail for the reception of spikes for securing the rails to their beds.

We do not claim a rail-joint having a slotted channel-shaped bed-plate, arch-shaped clips passing through the said plate, and a fastening-wedge; nor do we claim the combination of imperforated rail-sections with an unslotted bed-plate, clips which pass down outside of the same, and a fastening-wedge; but What we do claim, and desire to secure by Letters Patent, is—

In combination with imperforated rail-sections, a slotted unflanged longitudinal bed-plate, slotted clips arranged in pairs on the opposite sides of the rail, so as to clasp the same and pass through the slots in said bed-plate, and a fastening key or wedge, all of said parts being arranged and combined substantially as set forth.

GEORGE E. MORRIS.
CHAS. W. GREGORY.

Witnesses:
JOHN DANE, Jr.,
JAMES CRANE.